No. 639,300. Patented Dec. 19, 1899.
C. H. SHEPARD.
TYPE WRITING MACHINE.
(Application filed June 18, 1897.)
(No Model.)
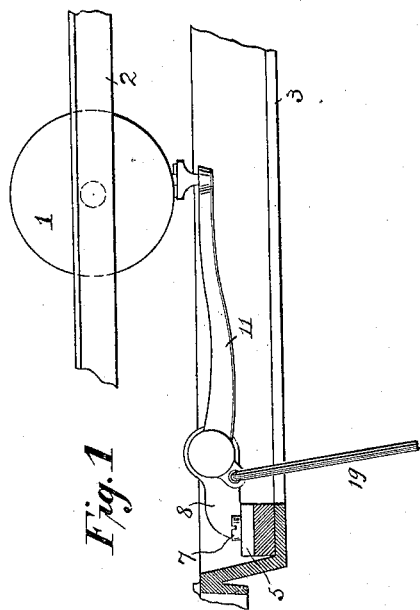
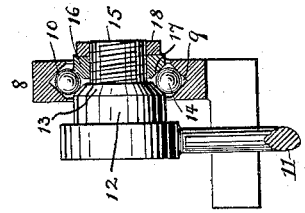
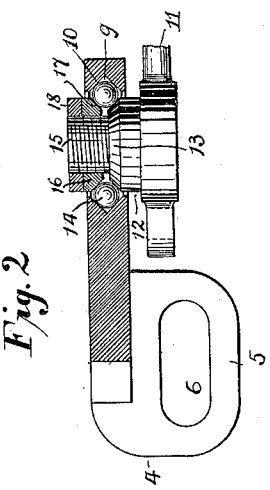
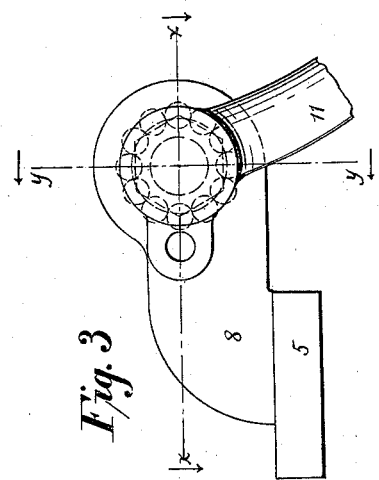
WITNESSES:
K. V. Donovan.
A. F. Warnecke.
INVENTOR:
Chas. H. Shepard
BY
Jacob Felbel
ATTORNEY.
THE NORRIS PETERS CO., PHOTO-LITHO., WASHINGTON, D. C.

UNITED STATES PATENT OFFICE.

CHARLES H. SHEPARD, OF NEW YORK, N. Y., ASSIGNOR TO THE WYCKOFF, SEAMANS & BENEDICT, OF ILION, NEW YORK.

TYPE-WRITING MACHINE.

SPECIFICATION forming part of Letters Patent No. 639,300, dated December 19, 1899.

Application filed June 18, 1897. Serial No. 641,272. (No model.)

*To all whom it may concern:*

Be it known that I, CHARLES H. SHEPARD, a citizen of the United States, and a resident of New York, (Brooklyn,) in the county of Kings and State of New York, have invented certain new and useful Improvements in Type-Writing Machines, of which the following is a specification.

My invention relates to ball-bearing type-bars, and has for its main object to provide a simple, durable, and effective structure; and it consists of the various features of construction and combinations of devices hereinafter more fully described, and particularly pointed out in the appended claims.

In the accompanying drawings, Figure 1 is a side elevation of a portion of a type-writing machine containing a ball-bearing type-bar embodying my invention. Fig. 2 is an enlarged horizontal section taken at the line $x\ x$ of Fig. 3. Fig. 3 is a side elevation. Fig. 4 is a vertical section taken at the line $y\ y$ of Fig. 3.

In the several views the same part will be found designated by the same numeral of reference.

1 designates the platen, 2 the carriage, and 3 the type-ring or top plate, of a type-writing machine. On the type-ring is mounted the hanger or bracket 4, comprising a horizontal base-piece 5, slotted at 6 for a retaining-screw 7, and a vertically-arranged comparatively thin plate, arm, or member 8, which near its forward end is formed or provided with a circular eye or opening 9, having a ball-bearing groove 10, which may be of V or other suitable shape, the said groove extending all around the eye interiorly of the hanger.

The type-bar 11 is provided on one side only with a hub or boss 12, which is beveled or coned, as at 13, at its extremity. Said coned portion of the type-bar enters within the eye in the hanger and forms a bearing like the bearing 10 for a single row or circular series of antifriction-balls 14. The type-bar is also provided with a screw 15, extending beyond the bearing 13, and onto this screw is screwed a threaded piece or nut 16, which is formed with a conical or tapered bearing 17, similar to that marked 13, which enters the eye in the hanger to contact with the balls 14 therein.

A check or set nut 18 is applied to said screw 15 on the outside of the bearing-piece 16 to hold the same firmly in place. The shape of the bearings 10, 13, and 17 is not material so long as proper surfaces are provided to coöperate with said balls and so long as the bearings may be adjusted to take up the wear, which adjustment, it will be understood, may be readily performed by removing or loosening the check-nut and screwing in the bearing-piece 16. By this construction the type-bar is wholly supported upon a single row of antifriction-balls, which are so held against lateral displacement that the free or type end of the bar is prevented from sidewise vibration, while it is enabled to swing freely toward and away from the platen. Furthermore, by this construction a large number of ball-bearing type-bars may be placed side by side within a given circle or segment of a circle. The short arm or heel of the type-bar is connected to a key-lever by a rod 19 in the usual manner.

What I claim as new, and desire to secure by Letters Patent, is—

1. In a type-writing machine, the combination of a hanger or bracket rigidly secured to the frame of the machine and comprising a thin vertical plate or arm having an eye provided with an interior ball-bearing groove, a type-bar arranged by the side of the plate and having on only its plate side a laterally-projecting ball-bearing cone and a screw, a companion cone adjustable on the said screw, and a single row of antifriction-balls fitted within the said groove and confined between the said cones for supporting said type-bar and preventing lateral vibration of the free end thereof.

2. In a type-writing machine, the combination of a hanger or bracket rigidly secured to the frame of the machine and comprising a thin vertical plate or arm having an eye provided with an interior ball-bearing groove, a type-bar arranged by the side of the plate and having on its plate side only a laterally-projecting ball-bearing cone and a screw, a companion cone adjustable on the said screw, a check-nut for said adjustable cone, and a single row of antifriction-balls arranged within the groove and confined between the said cones.

3. In a type-writing machine, the combination of a hanger or bracket rigidly secured to the frame of the machine and comprising a thin vertical plate or arm having an eye provided with an interior ball-bearing groove, a type-bar arranged by the side of the plate and having on its plate side only a pair of ball-bearing cones, one of which is adjustable, and a single row of antifriction-balls arranged within the groove and confined between the said cones.

4. In a type-writing machine, the combination of a thin vertical plate having an eye provided with an interior ball-bearing groove, a base-piece extending at a right angle to the plate, a screw for securing the base-piece to the frame of the machine, the axis of the screw extending in a plane parallel with the plate, a type-bar arranged by the side of the vertical plate and having on its plate side only a laterally-projecting ball-bearing cone and a screw, a companion cone adjustable on the said screw, and a single row of antifriction-balls arranged within the groove, and confined between the said cones.

Signed at New York city, in the county of New York and State of New York, this 15th day of June, A. D. 1897.

CHARLES H. SHEPARD.

Witnesses:
 K. V. DONOVAN,
 JACOB FELBEL.